United States Patent
Wang et al.

(10) Patent No.: US 7,451,012 B2
(45) Date of Patent: Nov. 11, 2008

(54) FAULT ELECTRIC ARC PROTECTION CIRCUITS AND METHOD FOR DETECTING FAULT ELECTRIC ARC

(75) Inventors: Xin Wang, Guangdong (CN); Qianjun Shen, Guangdong (CN)

(73) Assignee: Gree Electric Applicances Inc. of Zhuhai, Guangdong (CN)

( * ) Notice: Subject to any disclaimer, the term of this patent is extended or adjusted under 35 U.S.C. 154(b) by 0 days.

(21) Appl. No.: 11/709,064

(22) Filed: Feb. 21, 2007

(65) Prior Publication Data
US 2008/0201021 A1  Aug. 21, 2008

(51) Int. Cl.
G06F 19/00 (2006.01)
(52) U.S. Cl. ...................................................... 700/162
(58) Field of Classification Search ................. 700/292, 700/293, 162
See application file for complete search history.

(56) References Cited

U.S. PATENT DOCUMENTS

| | | | |
|---|---|---|---|
| 6,621,677 B1 * | 9/2003 | Amundsen ................... 361/103 |
| 7,021,950 B2 * | 4/2006 | Borrego Bel et al. ........ 439/181 |
| 7,236,338 B2 * | 6/2007 | Hale et al. .................... 361/42 |
| 7,317,598 B2 * | 1/2008 | Magnier ....................... 361/37 |
| 2007/0133134 A1 * | 6/2007 | Kilroy et al. .................... 361/5 |

* cited by examiner

Primary Examiner—Albert DeCady
Assistant Examiner—Chad Rapp
(74) Attorney, Agent, or Firm—Hamre, Schumann, Mueller & Larson, P.C.

(57) ABSTRACT

The present invention relates to an fault electric arc protection circuits which comprising a power source, a signal sampling device, a signal processing module, an arc detection control device and a power cut-off module. This invention also provides a method for detecting arc-fault, comprising the steps of S1, sampling the current signal of the circuits to be protected in real time, and outputting the sampled signal; S2, processing the sampled signal, then outputting the processed result; S3, detecting the processed result, and then determining whether an arc symbol has occurred based on the detected result. The advantages of the present invention is, when using the electric equipment, once a continuous fault electric arc occurred in the wires, the protection circuits can detect the fault electric are and cut off the power, thus to prevent the fire caused by the fault electric arc.

8 Claims, 4 Drawing Sheets

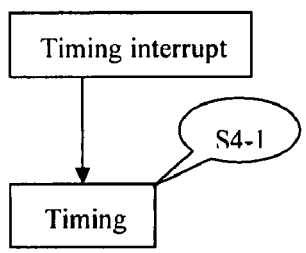
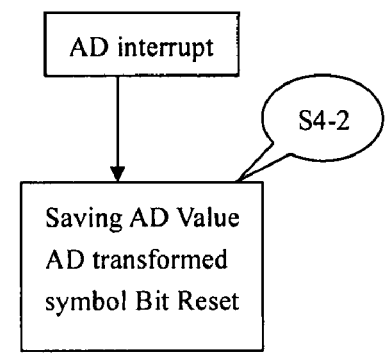
Fig.3                                    Fig.4

FAULT ELECTRIC ARC PROTECTION CIRCUITS AND METHOD FOR DETECTING FAULT ELECTRIC ARC

BACKGROUND OF THE INVENTION

1. Technical Field

The present invention relates to electrical technology, more particularly, relates to an Fault electric arc protection circuits and method for detecting fault electric arc.

2. Description of Related Art

Nowadays, with the popularization of home appliances, fire caused by electric equipments are increasing, and the fire caused by fault electric arc (such as arcs and electric sparks) is a substantial reason. The fault electric arc can be divided as shunt-wound fault electric arc, grounded fault electric arc and continuous fault electric arc.

At present, the over flow, creepage and over voltage protections can only protect the shunt-wound and grounded fault electric arcs, but not the continuous fault electric arc.

The fault electric arc protection devices in the prior art is focused on the fault electric arc in power circuit only, this fault electric arc occurs when a heavy current is constantly discharging; but there is no protection for the fault electric arc in electric circuits, such as the constant fault electric arc occurs at the connection portion of an electric circuit. Furthermore, most of the methods for detecting the fault electric arc protection circuits in the prior art is limited to estimate whether an fault electric arc occurred by detecting variation of the current wave, and the veracity and anti-interference ability of the detection is poor. Therefore, there is still limitation in preventing fire accidents caused by the continuous fault electric arc in the electrical equipment.

BRIEF SUMMARY OF THE INVENTION

The present invention provides an fault electric arc protection circuits that can automatically detect the dangerous fault electric arc and cut off the circuits once a continuous arc is occurred in the lines being protected; this invention also provides a method for detecting fault electric arc, once a continuous fault electric arc occurs in the lines being protected, the method can detect it in time, and cut off the power by an fault electric arc protection circuits before electrical fire is caused, thus to avoid fire and other fatal accident, and to protect the electric equipment.

The technical solution of the present invention is:

Providing an fault electric arc protection circuits which comprising a power source, a signal collection device, a signal processing module, an arc detecting control device and a power cut-off module; wherein the signal sampling device comprises a matching resistor $R_3$, and a current transformer without iron core; said signal processing module comprises a rectifying tube D1 and a voltage divider $R_2$; the fault electric arc detection control device is a single chin micyoco (SCM); the power cut-off module comprises a set of audion that is orderly connected, and an actuator portion; one end of the current transformer is grounded and the other end is connected to the rectifying tube D1 thus to connect to the SCM; the matching resistor $R_3$ is coordinately connected between the rectifying tube D1 and the current transformer, and the voltage divider $R_2$ is coordinately connected between the rectifying tube D1 and the SCM.

Advantageously, the SCM further connects a resetting resistor that having a DC source and a resistor $R_1$ connecting between the SCM and the DC source.

Advantageously, the actuator portion is a relay with closed contact.

The present invention further provides a method for detecting fault electric arc, wherein comprising the steps of:

S1, sampling the current signal of the circuits being protected simultaneously, and outputting the sampled signal;

S2, processing the sampled signal, then outputting the processed result;

S3, detecting the processed result, and then estimating whether an arc symbol has occurred based on the detected result.

Advantageously, the method further comprises step S4 of outputting a control signal according to the detected arc symbol to cut off the circuits being protected.

Advantageously, in step S1, sampling the current signal via a signal sampling device simultaneously, and the sampled signal is a current wave;

In step S2, processing the sampled signal by a signal process module, and the output result is a DC signal;

In step S3, the detection and estimation is conducted by an arc detection control device.

The advantage of the present invention is, when using the electric equipment, when a continuous fault electric arc occurs in the wires, the protection circuits can detect the arc and cut off the power, thus to prevent the fire caused by fault electric arc.

BRIEF DESCRIPTION OF THE DRAWINGS

FIGS. 3 and 4 are the flow charts of the program interruption of the SCM.

DETAILED DESCRIPTION OF THE INVENTION

Figure 1:
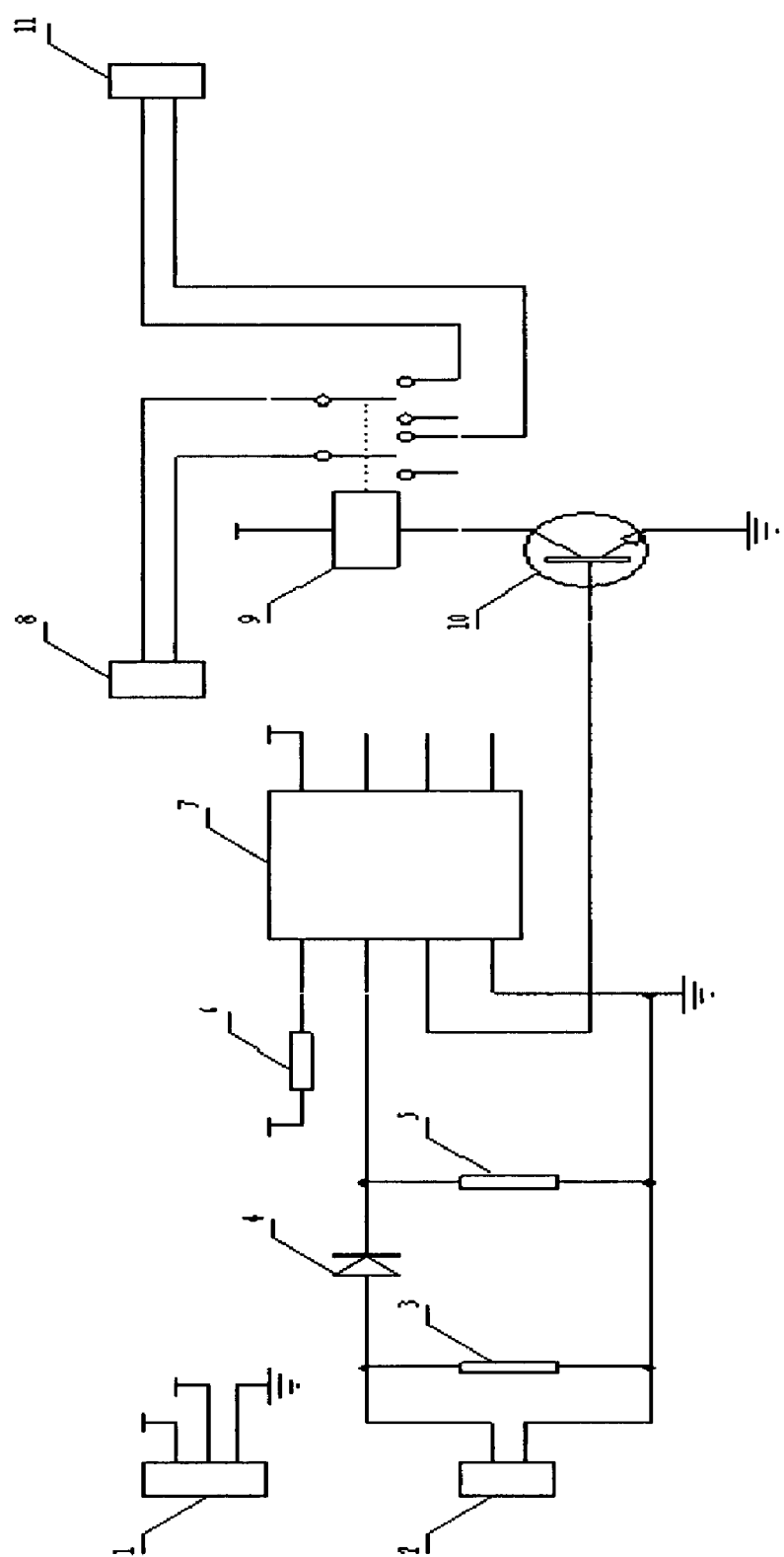
FIG. 1 is the schematic circuit diagram of the first embodiment of the present invention.

FIG. 1 is the schematic circuit diagram of the first embodiment of the present invention, comprising a power source, a signal sampling device, a signal processing module, an fault electric arc detection control device and a power cut-off module; wherein said signal sampling device comprising a watching resistor 3 and a current transformer without iron core; the signal processing module having a rectifying tube 4 and a voltage divider 5; the arc detection control device is SCM 7; the power cut-off module comprising a set of audion 10 that orderly connected, arid an actuator portion. The actuator portion in the present invention is relay 9 with closed contact.

One end of the current transformer 2 is grounded and the other end is connected with the rectifying tube 4 thus to input the SCM 7. The matching resistor 3 is coordinately connected between the rectifying tube 4 and the current transformer 2, and the voltage divider 5 is coordinately connected between the rectifying tube 4 and the SCM 7, to act as a voltage divider.

The circuits being protected is input with 220V AC power via an AC220V input end 8, the current pass through the relay 9 in the fault electric arc protection circuits, and outputs via an AC220V output end 11, thus provides rower for the circuits being protected. The circuits being protected is connected to the fault electric axe protection circuits, a DC power 1 provides working power for the fault electric arc protection circuits, and the matching resistor 3 is connected to both ends of the current transformer 2. The current transformer 2 is sleeved on the outside of the circuits being protected, while sampling the AC current signal of such circuits. If the circuits is working well, the waveform sampled by the current transformer 2 is an 50Hz impulse Cyc; if the circuits is small current inductive load, end an arc occurred, the Cyc of the inductive waveform in the current transformer 2 will change; and if the circuits is a large current inductive load, and an arc is occurred, the swing of the inductive waveform in the current transformer 2 will change, and the waveform will aberrance. Afterwards, the detected current signal will be commutated by a rectifier diode and voltage-divided by resistor 5 thus to transit as a DC signal; then the DC signal will be input to SCM 7, and evaluated by SCM 7 to determine whether an fault electric are occurred. If no fault electric arc is detected, the SCM 7 Will send out a low level signal, the audion 10 will cut-off, the power will pass through the relay 9 with closed contact to provide working voltage for the electric equipment being protected; if fault electric arc is detected in the circuits being protected, the SCM 7 will send out a high level signal. and the audion 10 Will conduct, the relay 9 with closed contact will shut down then, thus to cut off the power supply to implement the protection for the circuits, and avoid fire in the electric equipment.

In the present embodiment, the SCM further comprises a resetting circuits which comprises a DC power supply and a resistor connecting between the DC power and the SCM. When the fault electric arc is eliminated, DC power supply 1 will reset and re-conduct the power to the fault electric arc protection circuits through the resistor 6, and the SCM will work again.

The present invention further provides a method for detecting fault electric arc, firstly, sampling the current signal of the circuits being protected in real time by a signal sampling device, and outputting the sampled signal; secondly, processing the sampled signal by a signal processing module, then outputting the processed result of DC signal; and then, detecting the processed result by an arc detection control device, and then estimating whether an arc symbol has occurred based on the detected result; finally, outputting a control signal according to the detected arc symbol, and then cutting off the circuits being protected.

The signal sampling device, signal processing module, arc detecting control device and the power cut-off module can be the corresponding devices and modules as in the foresaid protection circuits.

Figure 2:
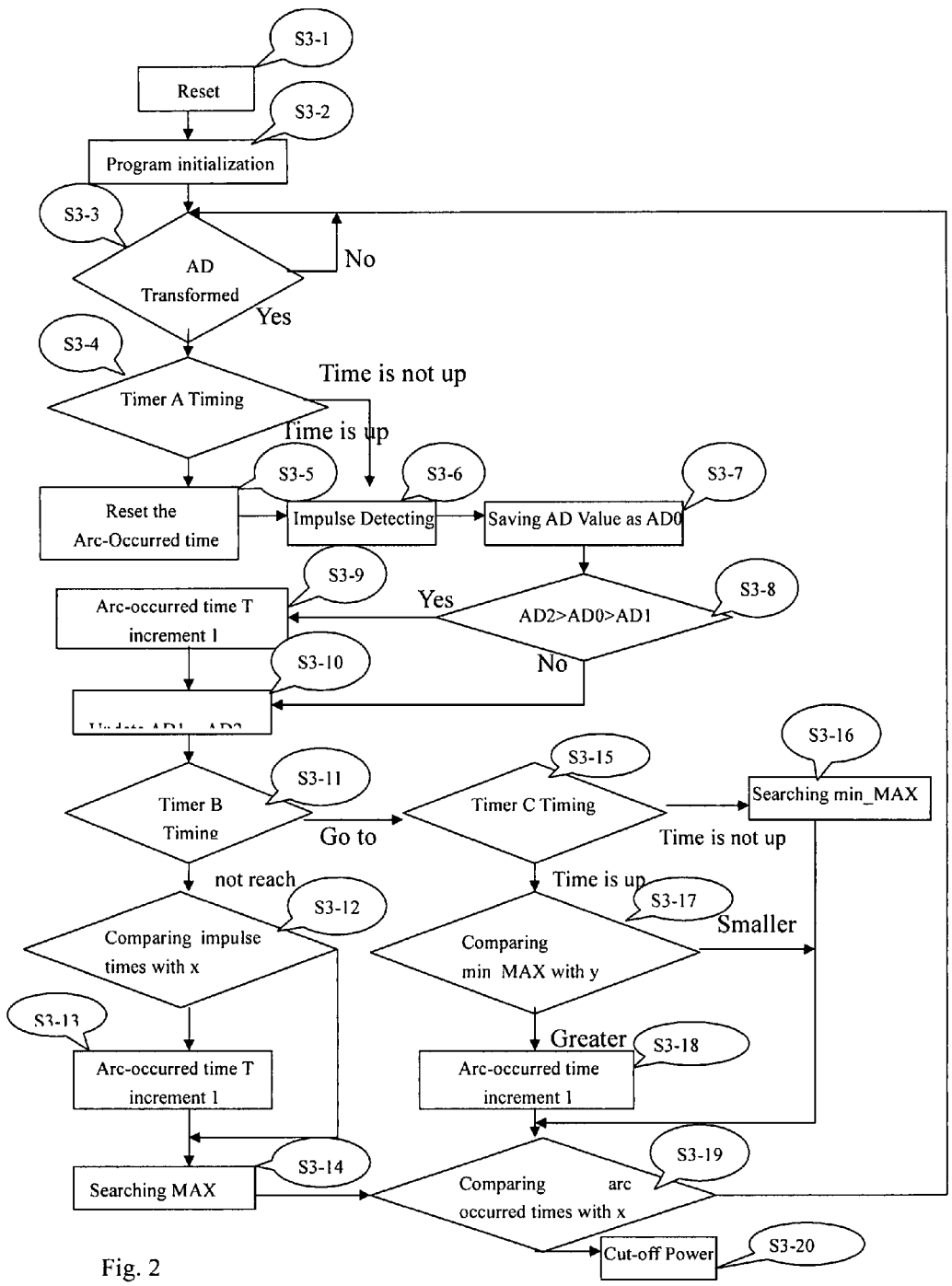
FIG. 2 is the flow chart of detecting and estimating of the processed current waveform by the SCM.

As shown in FIGS. 2, 3, and 4, the flow chart of the SCM are provided as follow:

(S3-1) resetting the SCM, then proceed to step S3-2;

(S3-2) program initialization in the SCM, all the symbol bits are as "0" at this time. Once the signal sampling device and signal processing device converting the analog signals into digital signals, the relevant numerical value is indicated as AD, and input into the SCM through one pin. Three symbol bits are set in the SCM as AD0, AD1, and AD2 respectively to save the latest three values of AD, in terms of push stack. While initializing, AD0=AD1=AD2=0. The control signal output to the power cut-off module from the SCM via another pin. Once the program of the SCM is initialized, proceed to step S3-3;

(S3-3) determining whether the AD conversion is finished, this is achieved by setting an AD converted symbol bit to indicate. If no AD value newly occurred, the AD converted symbol bit is set as "0" to indicate the conversion is not finished, and continually estimating whether a new AD value occurs; if a new AD value occurred, the AD converted symbol bit will set as "1" to indicate the conversion is achieved, then proceed to step S3-4;

(S3-4) resetting the AD converted symbol bit, timer A starts timing, when the time is up, proceed to step S3-5, otherwise, proceed to step S3-6;

(S3-5) setting the arc-occurred time as "0", timer A starts timing again, then proceed to step S3-6;

(S3-6) impulse detection: detecting the numbers of current waveforms that induce by the current transformer 2 in the time period when performing the AD transforming, and setting the impulse number counting bit, recording the numbers of the impulse, then proceed to step S3-7;

(S3-7) saving the present AD values: saving the present AD conversion value into AD0, then proceed to step S3-8;

(S3-8) estimating whether the values on the three zone bits measure up with AD2>AD0>AD1, if so, proceed to step S3-9, otherwise, proceed to step S3-10;

(S3-9) arc-occurred times increment equals to 1: setting a symbol bit T to indicate the times that arc occurred, increment of T equals to 1, then proceed to step S3-10;

(S3-10) in order to save the next detected AD value into AD0, update the values of AD1 and AD2, and saving the value of AD0 into AD1, the value of AD1 into AD2, then proceed to step S3-11;

(S3-11) timer B starts timing, when the time is up, proceed to step S3-15, otherwise, proceed to step S3-12;

(S3-12) comparing the numbers of the impulse with the predefined value X, the number of the impulse is accumulating the detected impulse number during the time period set in the timer B, the detection of the numbers of the impulse is finished in step S3-6, if the detected number is greater than the predefined value X, then proceed to step S3-13, otherwise, proceed to step S3-14;

(S3-13) arc-occurred time increment equals to 1, that is, adding 1 to the value of symbol bit T that indicating the times that arc occurred, then proceed to step S3-14;

(S3-14) searching for AD_MAX: in the time period set in timer B, searching for the maximum AD conversion value, and save as AD_MAX, that is, setting an AD_MAX symbol bit in the SCM, and the initial value is set as "0", then comparing the newest transformed AD0 value with AD_MAX value, if AD0>AD_MAX, then the AD_MAX value will be updated by this AD0 value; each time a new AD value is transformed, conduct a comparison to get the latest AD_MAX value, then proceed to step S3-19;

(S3-15) timer C starts timing, once the time reached the set time, then proceed to step S3-17, otherwise proceed to step S3-16;

(S3-16) searching for min_MAX: in the time period set in timer C, searching for the minimum AD_MAX conversion value, and save as min_MAX, that is, setting an min_MAX symbol bit in the SCM, and the initial value is set as "0", then comparing the AD_MAX value in step S3-14 with this min_MAX value, if AD_MAX>min_MAX, then the min_MAX value will be updated by this AD_MAX value; each time a new AD_MAX value is updated, conduct a comparison to get the latest min_MAX value, then proceed to step S3-19;

(S3-17) comparing the min_MAX comparison value with a set value "y": that is, setting two symbol bits of min_MAX0 and min_MAX1 in the SCM updated in terms of push stack, and saving the latest min_MAX value in step S3-16 as min_MAX0, and saving the original min_MAX0 value as min_MAX1, then comparing the difference value attained by deducting min_MAX1 from min_MAX0 with the set value "y", if the difference value greater than set value "y", then proceed to step S3-18, otherwise, proceed to step S3-19; and then saving this min_MAX0 as min_MAX1, in order to save the next min_MAX value as a new min_MAX0;

(S3-18) arc-occurred time increment equals to 1, that is, adding 1 to the value of symbol bit T that indicating the times that arc occurred, then proceed to step S3-19;

(S3-19) comparing the times that arc occurred with a set value "z", that is, comparing the value of symbol bit T that indicating the times arc occurred with the set value "z", if T>z, then proceed to step S3-20, otherwise, proceed to S3-3;

(S3-20) cutting off the power supply: the SCM set the level of the control output pin as high level, the audion will conducted and the actuator will cut-off, thus to cut off the power supply.

Wherein steps S3-4 to S3-10 are aiming at the situation that the when the arc occurred, the current in the circuits being protected is quite low (such as on the level of mA); and steps S3-11 to S3-14 are aiming at the situation that the when the arc occurred, the current in the circuits being protected is quite high (such as 15~20 A); and steps S3-15 to S3-18 are aiming at the situation that the when the arc occurred, the current in the circuits being protected is in middle level (such as around 10 A).

The SCM samples in a predefined time, if one of the following two situations occurs, SCM will interrupt its process, execute the interruptive procedure, and then re-start the process at the point of interrupt.

(S4-1) interrupt in a predefined time: setting a time period S, by each period of S, the program will interrupt in a predefined time, and then re-calculating the time period again;

(S4-2) AD transformed interrupt: saving the value of current, resetting the AD converted symbol bit, that is, the symbol bit of AD conversion is set to "1".

Figure 5:
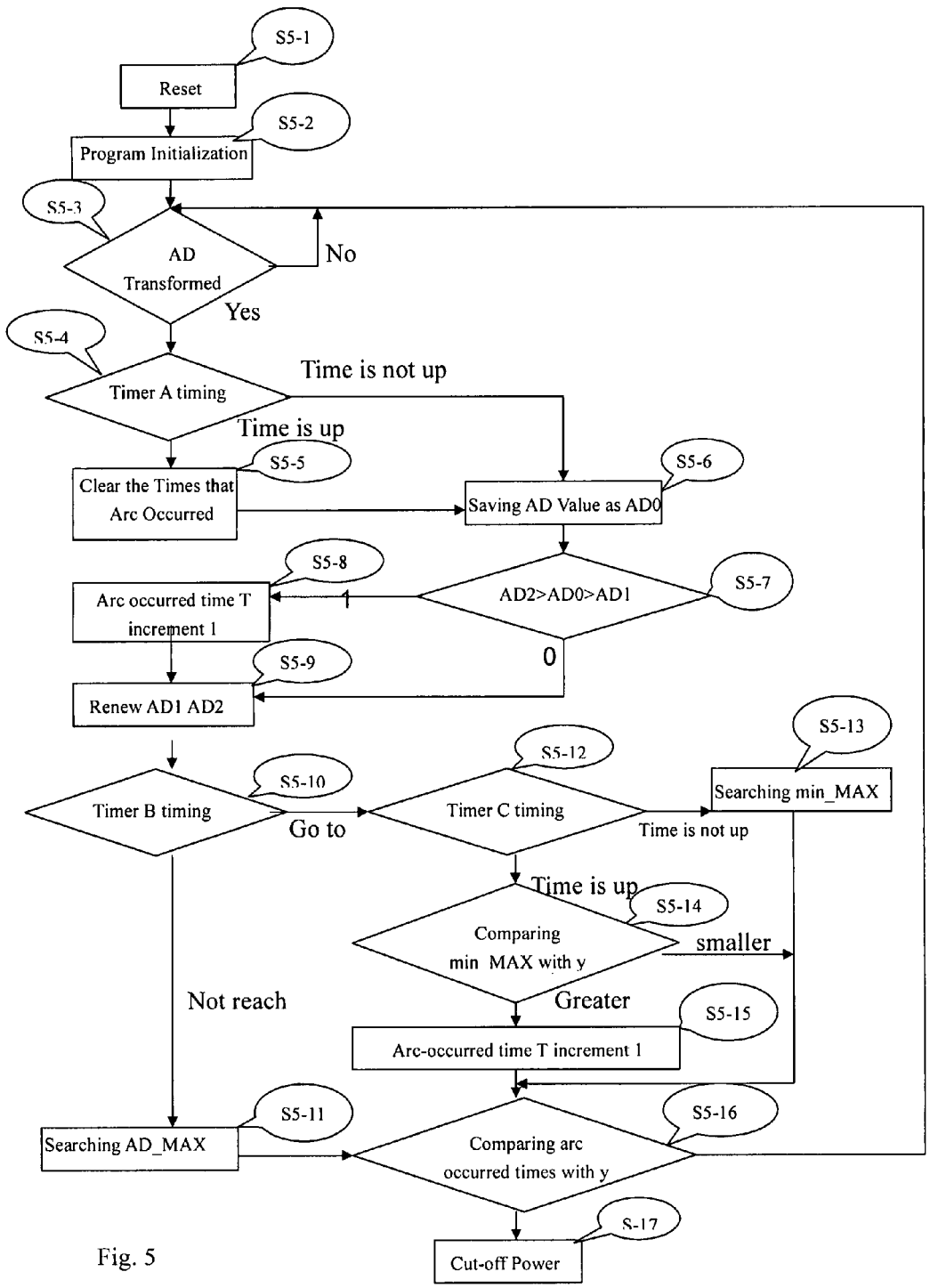
FIG. 5 is the flow chart of detecting and estimating of the processed current waveform by the SCM in the second embodiment.

It is appreciated by one of the skilled in the art, if the current of the circuits being protected is not very high, some of the steps can be skipped to reduce the burthen of the SCM. FIG. 5 shows the flow chart that the steps S11 to S13 in FIG. 2 have been skipped.

(S5-1) resetting the SCM, then proceed to step S5-2;

(S5-2) initializing program in the SCM, all the symbol bits are "0" at this time; wherein AD0=AD1=AD2=0, the symbol bits of AD0, AD1 and AD2 are the three AD values that corresponding to the latest sampled three signals transformed from analog to digital signals, the sampled AD signals are input from one pin, and the AD control signals are output from another pin of the SCM, then proceed to step S5-3;

(S5-3) determining whether the AD conversion is finished, this is indicated by setting an AD converted symbol bit. If no new AD value occurred, the AD converted symbol bit is set as "0" to indicate the conversion is not finished, and continually determining whether a new AD value occurred; if a new AD value occurred, the AD converted symbol bit will set as "1", then proceed to step S5-4;

(S5-4) zero setting the AD converted symbol bit, timer A starts timing, once the time is up, proceed to step S5-5, otherwise, proceed to step S5-6;

(S5-5) setting the times that arc occurred as "0", time setting A and then re-timing, then proceed to step S5-6;

(S5-6) saving the present AD values: saving the present AD conversion value into AD0, then proceed to step S5-7;

(S5-7) determining whether the values on the three symbol bits measure up with AD2>AD0>AD1, if that, proceed to step S5-8, otherwise, proceed to step S5-9;

(S5-8) arc-occurred time increment equals to 1: setting a symbol bit T to indicate the times that arc occurred, adding 1 on T, then proceed to step S5-9;

(S5-9) updating the values of AD1 and AD2, and saving the value of AD0 into AD1, the value of AD1 into AD2, then proceed to step S5-10;

(S5-10) timer B starts timing, once the time is up, proceed to step S5-11, otherwise, proceed to step S5-12;

(S5-11) searching for AD_MAX: in the time period set in timer B, searching for the maximum AD conversion value, and save as AD_MAX, that is, setting an AD_MAX zone bit in the SCM, and the initial value is set as "0", then comparing the lately transformed AD0 value with AD_MAX value, if AD0>AD_MAX, then the AD_MAX value will be updated by this AD0 value; each time a new AD value is transformed, conduct a comparison to get the latest AD_MAX value, then proceed to step S5-16;

(S5-12) setting time on timer C, once the time reached the set time, then proceed to step S5-14, otherwise proceed to step S5-13;

(S5-13) searching for min_MAX: in the time period set in timer C, searching for the minimum AD_MAX conversion value, and save as min_MAX, that is, setting an min_MAX symbol bit in the SCM, and the initial value is set as "0", then comparing the AD_MAX value achieved in step S5-11 with this min_MAX value, if AD_MAX>min_MAX, then the min_MAX value will be updated by this AD_MAX value; each time a new AD_MAX value is updated, conduct a comparison to get the latest min_MAX value, then proceed to step S5-16;

(S5-14) comparing the min_MAX comparison value with a set value "y": that is, setting two updated symbol bits of min_MAX0 and min_MAX1 in the SCM, and saving the latest min_MAX value achieved instep S5-13 as min_MAX0, and saving the original min_MAX0 value as min_MAX1, then comparing the difference value attained by deducting min_MAX1 from min_MAX0 with the set value "y", if the difference value is greater than set value "y", then proceed to step S5-15, otherwise, proceed to step S5-16; and then saving this min_MAX0 as min_MAX1;

(S5-15) adding 1 to the times that arc occurred, that is, adding 1 to the value of symbol bit T indicating the times that arc occurred, then proceed to step S5-16;

(S5-16) comparing the times that arc occurred with a set value "z", that is, comparing the value of zone bit T that indicating the times arc occurred with the set value "z", if T>z, then proceed to step S5-17, otherwise, proceed to S5-3;

(S5-17) cutting off the power supply: the SCM set the level of the control output pin as high level, the audion will conducted and the actuator will shut-off, thus to cut off the power supply.

Throughout the specification the aim has been to describe the preferred embodiment of the present invention without limiting the invention to any one embodiment or specific collection of features. Those skilled in the art may implement variations from the specific embodiment that will nonetheless fall within the scope of the invention.

The invention claimed is:

1. A fault electric arc protection circuits system comprising a power source, wherein the circuits system comprising:
   signal sample device for sampling current signals simultaneously, and output the sampled signals;
   signal processing module for processing the sampled signals, and output processed results;
   arc detecting control device for receiving the processed results from the signal processing module, and detecting the results and determining whether to output control signals or not; and
   power supply cutting off module for cutting off the power supply according to the control signals from the arc detecting control device,
   wherein said signal sampling device comprising a matching resistor and a current transformer without iron core: said signal processing module comprising a rectifying tube and a voltage divider; said arc detecting control device is a single chip micyoco; said power cut-off module comprising a set of audion that orderly connected, and an actuator portion; one end of the current transformer is grounded and an other end is connected with the rectifying tube thus to connect to the single chip micyoco; the matching resistor is coordinately connected between the rectifying tube and the current transformer, and the voltage divider is coordinately connected between the rectifying tube and the single chip micyoco.

2. The fault electric arc protection circuits system as in claim 1, wherein the single chip micyoco further connects a reposition resistor that comprising a DC power supply and a resistor connecting between the single chip micyoco and the DC power supply.

3. The fault electric arc protection circuits system as in claim 2, wherein the actuator portion is a relay with closed contact.

4. A method for detecting fault electric arc, wherein comprising the steps of:
   S1, sampling a current signal of circuits being protected simultaneously, and outputting the sampled signal;
   S2, processing the sampled signal, then outputting the processed result;
   S3, detecting the processed result, and then estimating whether an arc symbol has occurred based on the detected result; and
   S4, outputting a controlling signal according to the detected arc symbol, and then cutting off the circuits being protected,
   wherein;
      in step S1, sampling the current signal via a signal sampling device simultaneously, and the sampled signal is a current waveform:
      in step S2, processing the sampled signal by a signal process module, and the output result is a DC signal;
      in step S3, the detecting and determining is conducted by an arc detecting control device.

5. The method as in claim 4, wherein the arc detecting control device is a single chip micyoco, the detecting and determining processes are:
   (S3-1) resetting the single chip micyoco, then proceed to step S3-2;
   (S3-2) program initialization in the single chip micyoco, all symbol bits are as "0" at this time; once the signal sampling device and signal processing device converting analog signals into digital signals, the relevant numerical value is indicated as AD, and input into the single chip micyoco through one pin; three symbol bits are set in the single chip micyoco as AD0, AD1, and AD2 respectively to save the latest three values of AD, in terms of push stack; while initializing, AD0=AD1=AD2=; the control signal output to a power cut-off module from the single chip micyoco via another pin; once the program of the single chip micyoco is initialized, proceed to step S3-3;
   (S3-3) determining whether the AD conversion is finished, this is achieved by setting an AD converted symbol bit to indicate; if no AD value newly occurred, the AD converted symbol bit is set as "0" to indicate the conversion is not finished, and continually estimating whether a new AD value occurs; if a pew AD value occurred, the AD converted symbol bit will set as "1" to indicate the conversion is achieved, then proceed to step S3-4;
   (S3-4) resetting the AD converted symbol bit, timer A starts timing, when the time is up, proceed to step S3-5, otherwise, proceed to step S3-6;
   (S3-5) setting the arc-occurred time as "0" , timer A starts timing again, then proceed to step S3-6;
   (S3-6) impulse detection: detecting the numbers of current waveforms that induce by the current transformer 2 in the time period when performing the AD transforming, and setting the impulse number counting bit, recording the numbers of the impulse, then proceed to step S3-7;
   (S3-7) saving the present AD values: saving the present AD conversion value into ADO, then proceed to step S3-8;
   (S3-8) saving the present AD values: saving the present AD conversion value into ADO, then proceed to step S3-8;
   (S3-9) arc-occurred times increment equals to 1: setting a symbol bit T to indicate the times that arc occurred, increment of T equals to 1, then proceed to step S3-l0;
   (S3-10) in order to save the next detected AD value into AD0, update the values of AD1 and AD2, and saving the value of AD0 into AD1, the value of AD1 into AD2, then proceed to step S3-11;
   (S3-11) timer B starts timing, when the time is up, proceed to step S3-15, otherwise, proceed to step S3-12;
   (S3-12) comparing the numbers of the impulse with the predefined value X, the number of the impulse is accumulating the detected impulse number during the time period set in the timer B, the detection of the numbers of the impulse is finished in step S3-6, if the detected number is greater than the predefined value X. then proceed to step S3-13, otherwise, proceed to step S3-14;
   (S3- 13) arc-occurred time increment equals to 1, that is, adding 1 to the value of symbol bit T that indicating the times that arc occurred, then proceed to step S3-14;
   (S3-14) searching for AD_MAX: in the time period set in timer B, searching for the maximum AD conversion value, and save as AD_MAX that is, setting an AD_MAX symbol bit in the single chip micyoco, and the initial value is set as "0", then comparing the newest transformed AD0 value with AD_MAX value, if AD0>AD_MAX, then the AD_MAX value will be updated by this AD0 value; each time a new AD value is transformed, conduct a comparison to get the latest AD_MAX value, then proceed to step S3-19;
   (S3-15) timer C starts timing, once the time reached the set time, then proceed to step S3-17, otherwise proceed to step S3-16;
   (S3-16) searching for min _MAX: in the time period set in timer C, searching for the minimum AD_MAX conversion value, and save as min _MAX, that is, setting an min _MAX symbol bit in the single chip micyoco, and the initial value is set as "0", then comparing the AD_MAX value in step S3-14 with this min _MAX value, if AD_MAX >min_MAX, then the min_MAX value will be updated by this AD_MAX value; each time a new AD_MAX value is updated, conduct a comparison to get the latest min_MAX value, then proceed to step S3-19;

(S3-17) comparing the min_MAX comparison value with a set value "y": that is, setting two symbol bits of min_MAX0 and min_MAX1 in the single chip micyoco updated in terms of push stack, and saving the latest min_MAX value in step S3-16 as min_MAX0, and saving the original min_MAX0 value as min_MAX), then comparing the difference value attained by deducting min_MAX1 from min_MAX0 with the set value "y", if the difference value greater than set value "y", then proceed to step S3-18, otherwise, proceed to step S3-19; and then saving this min_MAX0 as min_MAX1, in order to save the next min_MAX value as a new min_MAX0;

(S3-18) arc-occurred time increment equals to 1, that is, adding 1 to the value of symbol bit T that indicating the times that arc occurred, then proceed to step S3-19;

(S3-19) comparing the times that are occurred with a set value "z", that is, comparing the value of symbol bit T that indicating the times arc occurred with the set value "z", if T> z, then proceed to step S3-20, otherwise, proceed to S3-3;

(S3-20) cutting off the power supply: the single chip micyoco set the level of the control output pin as high level, the audion will conducted and the actuator will cut-off, thus to cut off the power supply.

6. The method as in claim 5, wherein the processes of detecting and determining of the single chip micyoco comprising an interruption step, which is, timely interrupting, setting a tine period S, by each period of S, the program will timely interrupt, and then re-calculate the time period again.

7. The method as in claim 5, wherein the processes of detecting and determining of the single chip micyoco comprising an interruption step, which is, AD transforming interruption, saving the value of current, resetting the AD converted symbol bit, which is, setting the symbol bit of AD conversion as "1".

8. The method as in claim 4, wherein comprising the steps of:

(S5-1) resetting the single chip micyoco, then proceed to step S5-2;

(S5-2) initializing program in the single chip micyoco, all the symbol bits are "0" at this time; wherein AD0=AD1=AD2=0, the symbol bits of AD0, AD1 and AD2 are the three AD values that corresponding to the latest sampled three signals transformed from analog to digital signals, the sampled AD signals are input from one pin, and the AD control signals are output from another pin of the single chip micyoco, then proceed to step S5-3;

(S5-3) determining whether the AD conversion is finished, this is indicated by setting an AD convened symbol bit; if no new AD value occurred, the AD converted symbol bit is set as "0" to indicate the conversion is not finished, and continually determining whether a new AD value occurred; if a new AD value occurred, the AD convened symbol bit will set as "1", then proceed to step S5-4;

(S5-4) zero setting the AD converted symbol bit, timer A starts timing, once the time is up, proceed to step S5-5, otherwise, proceed to step S5-6;

(S5-5) setting the times that arc occurred as "0", time setting A and then re-timing, then proceed to step S5-6;

(S5-6) saving the present AD values: saving the present AD conversion value into AD0, then proceed to step S5-7;

(S5-7) determining whether the values on the three symbol bits measure up with AD2>AD0>AD1, if that, proceed to step S5-8, otherwise, proceed to step S5-9;

(S5-8) arc-occurred time increment equals to 1: setting a symbol bit T to indicate the times that arc occurred, adding 1 on T, then proceed to step S5-9;

(S5-9) updating the values of AD1 and AD2, and saving the value of AD0 into AD1, the value of AD1 into AD2, then proceed to step S5-10;

(S5-10) timer B starts timing, once the time is up, proceed to step S5-11, otherwise, proceed to step S5-12;

(S5-11) searching for AD_MAX: in the time period set in timer B, searching for the maximum AD conversion value, and save as AD_MAX, that is, setting an AD_MAX zone bit in the single chip micyoco, and the initial value is set as "0", then comparing the lately transformed AD0 value with AD_MAX value, if AD0>AD_MAX, then the AD_MAX value will be updated by this AD0 value; each time a new AD value is transformed, conduct a comparison to get the latest AD_MAX value, ten proceed to step S5-16;

(S5-12) setting time on timer C, once the time reached the set time, then proceed to step S5-14, otherwise proceed to step S5-13;

(S5-13) searching for min_MAX: in the time period set in timer C, searching for the minimum AD_MAX conversion value, and save as min_MAX, that is, setting an min_MAX symbol bit in the single chip micyoco, and the initial value is set as "0", then comparing the AD_MAX value achieved in step S5-11 with this min_MAX value, if AD_MAX > min_MAX, then the min_MAX value will be updated by this AD_MAX value; each time a new AD_MAX value is updated, conduct a comparison to get the latest min_MAX value, then proceed to step S5-16;

(S5-14) comparing the min_MAX comparison value with a set value "y": that is, setting two updated symbol bits of min_MAX0 and min_MAX1 in the single chip micyoco, and saving the latest min_MAX value achieved instep S5-13 as min_MAX0, and saving the original min_MAX0 value as min_MAX1, then comparing the difference value attained by deducting min_MAX1 from min_MAX0 with the set value "y", if the difference value is greater than set value "y", then proceed to step S5-15, otherwise, proceed to step S5-16; and then saving this min_MAX0 as min_MAX1;

(S5-15) adding 1 to the times that arc occurred, that is, adding 1 to the value of symbol bit T indicating the times that arc occurred, then proceed to step S5-16;

(S5-16) comparing the times that arc occurred with a set value "z", that is, comparing the value of zone bit T that indicating the times arc occurred with the set value "z", if T> z, then proceed to step S5-17, otherwise, proceed to S5-3;

(S5-17) cutting off the power supply: the single chip micyoco set the level of the control output pin as high level, the audion will conducted and the actuator will shut-off, thus to cut off the power supply.

* * * * *